DIGITAL INFORMATION HANDLING APPARATUS

Original Filed Dec. 30, 1955

INVENTORS
Chris A. Lay, Jr.
Alfred K. Susskind
BY
Kenway, Jenney, Witter & Hildreth
ATTORNEYS

United States Patent Office 3,150,353
Patented Sept. 22, 1964

3,150,353
DIGITAL INFORMATION HANDLING APPARATUS

Chris A. Lay, Jr., Wayne, N.J., and Alfred K. Susskind, Concord, Mass., assignors, by mesne assignments, to Giddings & Lewis Machine Tool Company, Fond du Lac, Wis., a corporation of Wisconsin Continuation of abandoned application Ser. No. 556,724, Dec. 30, 1955. This application Feb. 2, 1959, Ser. No. 790,771

5 Claims. (Cl. 340—174)

This invention relates to the handling of information in bi-valued digital form and more particularly to sensing the switching of bi-state storage elements from a first to a second state. The invention, moreover, pertains to magnetic registers for digital information and the sensing of the states of magnetic storage cores.

Magnetic registers have been known to the digital computing art for an number of years. In one embodiment these registers take the form of stepping registers in which two banks of magnetic elements or cores are utilized to store a line or word of digital information. In such a stepping register the information is fed serially to the first core in a row and thereafter is stepped sequentially through the cores of the row.

In order to store the information while it is being stepped from one core to the next, a second line of cores is utilized which acts as temporary storage register for the information being stepped along the first row of cores. In this type of device a bit of digital information is used to set the first core of the first row and is thereafter temporarily shifted to and stored in the first core of the second row and hence shifted to the second core of the first row and so forth. A device of this type is decribed in a copending application to the same assignee entitled Magnetic Data Supply Apparatus, invented by Richard H. Fuller and Dudley A. Buck, Serial No. 502,324, now U.S. Patent 2,987,707. It will be apparent that this type of magnetic register requires in fact two registers, one of which is active only a small portion of the time and which is utilized only for temporarily storing the digital information as it is stepped into the register.

When digital information has been stored in the register it is frequently desirable that the number be read out repeatedly from all the cores in parallel. To accomplish this it is necessary either that the word be read out in such a way as to not destroy the state of the cores in the register or else that some convenient and expeditious way of rewriting the information in the cores be provided.

Where the core register is to be utilized in digital substracting circuitry it is also desirable that some means be provided for complementing the word which is stored in the register. This, in binary digital notation, means reversing the magnetization state of each of the cores in the register, whatever that state may be. Such a step generally requires relatively complex circuitry.

The general aim of the invention is to realize an improved, compact, and reliable arrangement for determining when a bi-state storage device is switched from one state to another by temporarily storing the response or lack of repsonse in a semi-conductor device having a "slow recovery" resistance characteristic.

It is another object of this invention to provide a simple and efficient means of controlling magnetic core registers without the need for additional cores to act as temporary storage media.

It is similarly the object of this invention to provide a single line stepping register which does not need a second register of cores for temporary storage.

It is further the object of this invention to provide a simple and improved method of automatically resetting a core, which is reversed in the state or direction of its residual magnetization by a readout current, back to its original state.

It is an additional object of this invention to provide a simple and effective circuit for reversing the state of each core in a register and thereby complementing the binary number contained in the register.

It is the feature of this invention that these desirable objectives may be achieved through the use of a semi-conductor device, such as a crystal diode, having particular characteristics making it undesirable for many applications, while at the same time providing very useful characteristics for use in the subject invention.

This invention will be more easily understood upon reference to exemplary embodiments illustrated by the accompanying drawings, in which.

Figure 1:
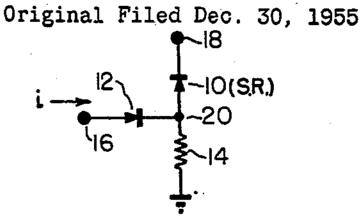
FIGURE 1 illustrates a basic diode amplifier circuit utilized in this invention.

While the invention has been shown and will be described in some detail with reference to particular embodiments thereof, there is no intention that it thus be limited to such detail. On the contrary, it is intended here to cover all modifications, alternatives and equivalents falling within the spirit and scope of the invention as defined by the appended claims.

The operation of this invention depends upon the characteristics of semi-conductor devices of the type having what is known as a "slow recovery" of a normally high resistance, after such resistance has been lowered by current flow. In their simplest form, such devices may be asymmetrically conductive diodes of the P-N junction type. When such a diode is conducting in the forward direction the applied voltage provides a steady supply of current "carriers." The forward impedance or resistance of the diode is relatively low. Without going unnecessarily deeply into the special concepts involved in semi-conductor circuitry it may be said that a diode passing a forward current is characterized by a large number of holes or minority carriers, flowing into the "N" region of the diode from the "P" region of the diode. These so-called holes have a lifetime which may vary from fractions of a microsecond to tens of microseconds for different types of diodes. It the diode has been conducting in the forward direction for a time which is large with respect to the hole lifetime then the hole density reaches a steady state distribution across the diode.

When voltage applied to the diode is switched to the so-called reverse bias direction from the forward bias direction, these minority carriers must disappear before the diode will fully oppose reverse curernt flow, i.e., reach its steady state value of back resistance. As these minority carriers are disappearing, a transient phenomenon of high current flow in the reverse bias direction takes place. In other words, the normally high back resistance is temporarily relatively low. At first this reverse current is very large and in fact is limited by the external parameters, e.g., voltage and resistance, of the circuit with which the diode is connected. As the holes are redistributed the back resistance of the diode increases until all of the excess holes have disappeared and the back resistance assumes its static, relatively high value. In effect, these holes constitute a temporarily stored current which may be swept out by the application of a reverse bias voltage. The above-described operation of a diode is described in The National Bureau of Standards Technical News Bulletin, vol. 38, No. 10. It should be noted that if the reverse bias voltage is not applied soon after the forward current is cut off, no reverse current surge will take place.

All semi-conductor junction devices will exhibit these "delay" characteristics to a larger or smaller degree. The operation of the special diode amplifier circuit shown in FIG. 1 utilizes two diodes, one of which has a slow recovery time and the other of which has a relatively rapid recovery time. The circuit as here shown employs a slow recovery diode 10 together with a fast recovery diode 12. The resistance 14 ties the mid-points of the two diodes to ground or other point of reference potential. The output is taken from the mid-point of the two diodes. Throughout the drawing, slow recovery diodes are designated by the symbol "(S.R.)" following the reference characters applied thereto.

The slow recovery diode 10 is capable of storing energy for a short but useful period of time (e.g., one or two microseconds). The 1N91 type of germanium junction diode has proven satisfactory in this regard and other diodes particularly the diffused and grown junction types (for example, Western Electric 1784) have suitable characteristics for use in circuits wherein the hole storage property of the semi-conductor is utilized. The diode 12, on the other hand, is a fast recovery diode which is assumed for the purposes of these circuits to be a true bi-valued element not involving the storage of current. Its recovery time may be of the order of hundredths of a microsecond. A point-contact diode, for example of the 1N38A type, is suitable for use as diode 12.

Assuming that a voltage is applied to terminals 16 and 18, making the latter positive with respect to the former, current in the forward direction is supplied over a terminal 16 and will flow through diodes 12 and 10 which present essentially a short circuit to the current. The current will thus "set" the diode 10 and thus, in effect, storing energy in diode 10 at relatively low levels. If within a very short period (less than the recovery time of diode 10) after that current has been terminated, a voltage pulse is supplied at terminal 18 making the latter positive with respect to ground and creating a reverse bias for the diode 10, there will be a large temporary current flow reversely through the diode 10 before it reaches its high reverse resistivity state. This current will be blocked by the fast recovery diode 12 and will either be passed through the resistor 14 to ground or out through any other conductive path leading from the output terminal 20.

In accordance with the present invention, the state of a bi-state storage element is determined by coupling a "slow recovery" semi-conductor device to the element by means which produce current flow in a low resistance path through the device in response to switching of the element from its first to its second state, thereby creating minority carriers within the device. The magnitude of resistance presented by a reverse conduction path in the device is sensed by applying a reverse voltage thereto. If the back resistance is high, substantially no reverse current occurs, indicating that the storage element has not been switched to its second state just prior to the application of the reverse voltage. On the other hand, if the back resistance is low, appreciable reverse current occurs, indicating that the element has just been switched to its second state. By timing the application of a signal which tends to switch the storage element from the first to the second state and the application of the reverse voltage, the storage element is known to have been in its first state prior to the signal if appreciable reverse current occurs. And such current may be used, directly or indirectly, to change the state of another, or the same, storage element.

There is illustrated by reference to FIG. 2 a particularly valuable embodiment of this basic circuit in a novel magnetic shift register having half the usual number of cores and certain other very desirable characteristics which will appear as this circuit is explained. The cores 22, 24, and 26 constitute storage elements capable of residing in and being switched to either of two states, such cores being made of magnetic material having a substantial residual magnetization characteristic, as is well known. The two states of each storage element or core are represented by the two senses or directions of residual flux therein, and switching from one state to the other occurs when magnetomotive forces of the appropriate sense are applied. The first core 22 carries the input winding 28 which is utilized to set the core 22 in accordance with the incoming bit of digital information. Each core in addition carries a transfer or readout winding 30, 32 and 34 and these windings are connected in series by lead 35 to a current pulse source 38 which is capable of supplying a current pulse which thus creates a magnetomotive force to all cores tending to set them in the second state or direction of residual flux. The input and transfer windings constitute control windings which are used to set the core to a desired state of residual magnetization.

The cores 22 and 24 are linked together by a connecting circuit similar to that shown in FIG. 1. This includes means for producing current in a forward direction through a slow recovery diode 48, coupled to an output winding 40 on the core 22, whenever the core switches from its first to its second state. The core 22 carries an output winding 40, one terminal of which is connected to ground, and the other terminal of which is connected to the quick recovery diode 42. The second core 24 carries what may be broadly considered a utilization device, i.e., an input winding 44 one terminal of which is connected through the resistance 46 to ground and the other terminal of which is connected to the opposite side of the diode 42 from the widing 40. The slow recovery or temporary storage diode 48 also connects the input winding 44 and the output side of the quick recovery diode to the voltage pulse source 50. It will be seen that a series circuit is established from ground through the output winding 40, the similarly poled diodes 42 and 48, and back to ground at the source 50. Also a series circuit is established across the slow recovery diode 48, leading through the input winding 44 and the resistance 46 to ground, and from ground through the source 50 to the opposite side of the diode 48. In other words, the utilization device or input winding 44 is connected in parallel with the series combination of the output winding 40 and the fast recovery diode 42.

Similarly, the cores 24 and 26 are connected by means of an output winding 52 on core 24, an input winding 54 on core 26, the resistance 56 and the quick recovery diode 58. The slow recovery diode 60 is connected with its forward direction conducting from the winding 54 to the voltage pulse source 50.

Appropriate pulse timing is achieved by use of the delay element 62 which may be a monostable-multivibrator or other fixed delay circuit which energizes the voltage source 50 a predetermined length of time after the current pulse source 38 has been energized. This length of time must produce a reverse bias voltage from source 50 at a time after the output from winding 40 (for example) which is longer than the recovery time of the quick recovery diode 42 and shorter than the recovery time of the slow recovery or storage diode 48.

The voltage source 50 triggered by the multivibrator may for convenience be a blocking oscillator and the current source 38 may be a pentode which receives its grid signal from another monostable multivibrator. These elements constitute well known standard components in the electrical art and numerous engineering alternatives could readily be provided.

Figure 2:
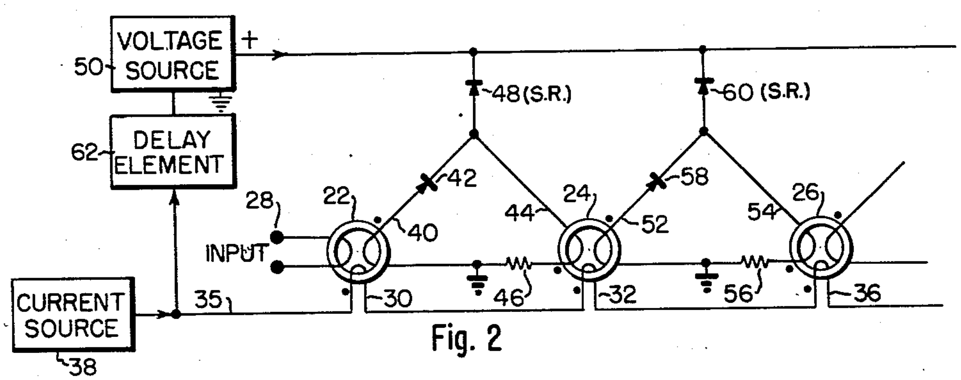
FIG. 2 illustrates a stepping register circuit utilizing this invention.

The operation of the circuit illustrated in FIG. 2 is as follows. Core 22 can be set by the input winding 28 to either of two states of residual magnetization, one corresponding to the storage of a digital 0, and the other corresponding to the storage of a digital 1. Assuming that the core 22 is set to a state which corresponds to the storage of a digital 1, a transfer current pulse from the source 38 over lead 35 to energize the winding 30 will reverse the state of the core back to that corresponding to a digital 0 and at the same time will result in a voltage pulse of predetermined polarity being induced in the winding 40. The polarity of the voltage pulse is chosen so that output current will pass forwardly through the diode 42 and out through the short circuit presented by the diode 48 which conducts in its forward direction, having very little resistance. This current will have the effect of "charging" the diode 48. The same pulse of current over lead 35 which is utilized to drive the winding 30 (and windings 32 and 34) is delayed by the element 62 for a short interval (e.g., a few tenths of a microsecond) to permit the cores to reverse their state and then is utilized to trigger a voltage source 50, which thereby applies a voltage in the reverse bias direction to the slow recovery diodes 48 and 60.

If the core 22 has just been switched to the "0" state, this reverse bias voltage applied to diode 48 will result in a large surge of current in the reverse direction through this diode, since the latter will be in a condition of temporarily lowered back resistance. This current will be blocked by the quick recovery diode 42 and will therefore flow through the winding 44 on core 24 in a direction which will result in setting core 24 to that state or direction of residual magnetization which corresponds to the storage of a digital 1. By this means the digital 1 which was formerly stored in core 22 is now transferred to core 24. Similarly, at the same time that the content of core 22 was read out, the content of core 24 was read out by the readout current applied to the winding 32. Thus the contents of cores 22 and 24 were read out simultaneously and stored as the states (i.e., high or low back resistance depending upon whether cores 22 and 24 were originally in the 0 or 1 state) of the slow recovery diodes 48 and 60. A voltage pulse in the reverse bias direction on these diodes 48 and 60 timed a short interval after the current pulse supplied by source 38 will result in setting cores 24 and 26 to correspond to the previous states of cores 22 and 24, respectively. By this means digital information is stepped into the register which may contain any number of cores serially connected in this manner.

Of course, if the core 22 is in the binary "0" state when an "interrogating" pulse is supplied to the readout winding 30, then no reversal of flux in that core occurs. No voltage is induced in the output winding 40, so no current flows through the diodes 42 and 48. Thus, when the delayed reverse voltage is applied to the diode 48, the latter contains no "holes" and will not conduct. No current can flow through the winding 44 so that the second core 24 is left in the "0" state, which is the state created by the preceding current pulse in its readout winding 32. It will thus be apparent that the binary number or state (whether it be "0" or "1") of each core is "shifted" to the next succeeding core in response to each interrogating pulse from the source 38.

In the experimental register utilizing this design the conventional 1N38A diode proved satisfactory for the quick recovery diodes 42 and 58, while the 1N91 type was utilized as the slow recovery diodes 48 and 60. It was found that the current from the source 38 should be of the order of .8 ampere, the current through the diodes 48 and 60 of the order of .15 ampere, and the reverse bias voltage of the order of 100 volts.

In the experimental stepping register having current and voltage magnitudes of this order the input windings were 30 turns, the output windings 20 turns and the windings used to drive each of the cores simultaneously 5 turns. The timing means was set to produce the reverse bias voltage on the slow recovery diodes at an interval of approximately .1 microsecond after the forward pulse passed through this diode. The output current from the core through the diode produced a pulse of approximately 2 microseconds' duration and the reverse current had a duration of approximately 1 microsecond. This reverse current was of the order of one-third the magnitude of the setting current. The register was able to circulate a stored digital word at a 100 kilocycle rate with no deterioration in the switching behavior of the cores or diodes. It required half the input power and half the number of diodes and cores utilized in the standard two core per digit register used in most digital computing machinery.

While the stepping register construction above described is believed to constitute the most widely useful and general form of this invention the construction can be varied or added to in a number of ways to provide diode controlled magnetic registers having somewhat different capabilities when used as computer elements. For example, in digital multiplication it may be desirable to store a digital number or "word" in a bank of cores and repeatedly read the contents of the register to permit the addition of the number to itself a large number of times, thereby accomplishing multiplication. In such a register it is either necessary to rewrite the readout information each time that it is used or else utilize some non-destructive means of readout. It is possible by the use of the above-described diode control to accomplish an automatic rewrite of information which permits a speed of operation and convenience of construction comparable to a true non-destructive readout. Such a register constituting one embodiment of the invention is shown in FIGURE 3.

Figure 3:
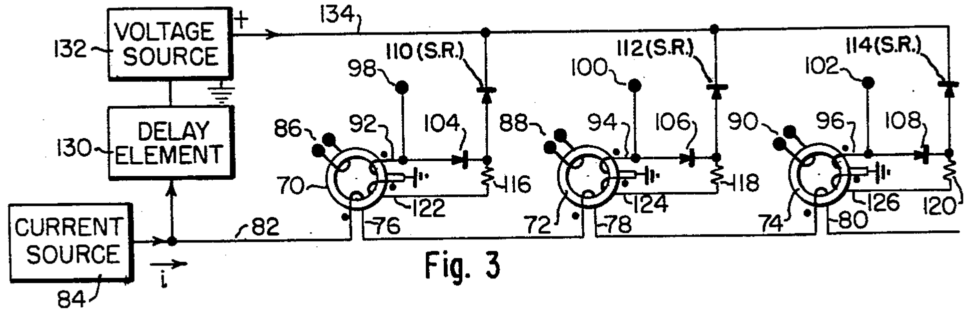
FIG. 3 illustrates a non-destructive readout circuit constructed in accordance with this invention.

By reference to FIGURE 3 it will be seen that the three cores 70, 72 and 74 carry the transfer windings 76, 78 and 80 which are formed from lead 82 and driven by the current source 84. The term transfer is used to indicate transfer of the information to slow recovery semi-conductor devices for temporary storage. For purposes of simplicity, separate input windings 86, 88 and 90 are illustrated for each core. The stepping register construction described above could be used, but would complicate the drawings. Assuming that input currents on the three read-in windings 86, 88 and 90 are used to set the cores to store digital information, the problem remains of repeatedly reading out of the cores and rewriting said information back into them.

To accomplish this result the output windings 92, 94 and 96 are carried by each core. These windings are connected at one end to ground and are connected at the other end to the output terminals 98, 100 and 102. The output windings 92, 94 and 96 feed the networks consisting of quick recovery diodes 104, 106 and 108, slow recovery diodes 110, 112 and 114, and resistors 116, 118 and 120. Each resistor is connected between the midpoint junction of the two diodes and the terminals at one end of corresponding reinsertion or reset windings 122, 124 and 126 which may be viewed as utilization devices.

The operation of these networks is identical with the operation described with respect to FIG. 2, except that the energy stored in the slow recovery diodes 110, 112 and 114, instead of being used to set the state of the next core in the register, is used to reset the state of the core from which the information was read. Thus a current pulse supplied on lead 82 and passing through the transfer windings 76, 78 and 80 will result in a current in the output windings 92, 94 and 96 if the corresponding cores stored a digital 1. This will set the slow recovery diodes 110, 112 and 114. The same current pulse applied to line 82 is delayed by the delay element 130 and utilized to trigger a voltage pulse from the voltage source 132. This positive voltage will be applied to the lead 134 which is connected to the reverse bias side of the diodes 110, 112 and 114. If any of these diodes have been set by the reading out of a digital 1 from the cores 70, 72 or 74, the voltage applied in the reverse direction to them will result in a current surge through the reset windings 122, 124 and 126, thereby restoring the information to the register.

An additional operation which is made possible by this invention and which is desirable, for example, in a core register being used for subtraction is the process of complementing the register. This involves reversing the state of each core in the register whether it is in the state denoting the storage of a digital 1 or the state denoting the storage of a digital 0. The apparatus for achieving this result is shown in FIG. 4.

Figure 4:
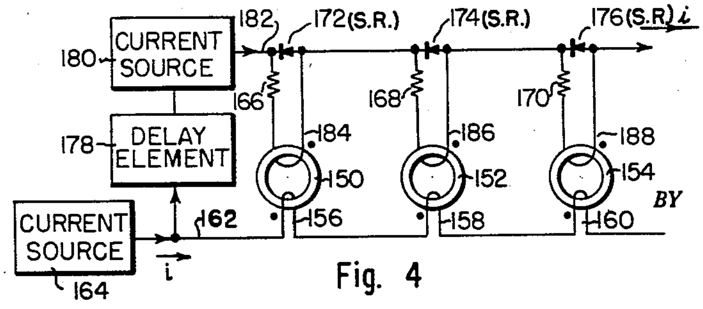
FIG. 4 illustrates a complementing circuit utilizing this invention.

The complementing circuit in FIG. 4 illustrates three cores 150, 152 and 154. These cores may be set in the desired state either by a step-in form of register as described by reference to FIG. 2 or by individual setting windings as described by reference to FIG. 3. For purposes of simplicity in explanation the input windings to the cores of FIG. 4 have been omitted and it will be assumed in the explanation that the cores are set to the initially desired digital state.

Each core carries a transfer winding 156, 158 and 160 and these windings are connected in series by the lead 162 and driven by the current source 164. Each of the cores carries a separate output winding 184, 186 and 188 in series respectively with resistors 166, 168 and 170. The slow recovery diodes 172, 174 and 176 are coupled to the respective output windings 184, 186, 188 by completing the loop formed partially by the winding and the resistor on each core.

The current pulse source 164, as in preceding instances, drives a delay element 178 and this element in turn drives another similar current source 180 as distinguished from a voltage source in FIGS. 2 and 3. Current from the source 180 flows through either each slow recovery diode or its associated output winding and series resistor, depending upon whether or not that diode has been previously "set."

Let it be assumed that the core 152 is in a state denoting the storage of the digital 1 and that this state is reversed by the application of a driving current to the lead 162 from the source 164. Let it also be assumed that the cores 150 and 154 are in the state denoting the storage of a digital 0 and that a current pulse supplied to lead 162 and hence to the transfer windings 156 and 160 on these two cores will have no effect on the state of residual magnetization and therefore no output current will be created in the output windings of these cores. The sense of the output winding from core 152 must be chosen to pass the output current in the forward direction through the diode 174.

The forward current through the diode 174 will leave it in a condition to conduct current in the reverse bias direction for a limited period of time as in the above-described circuits. In addition, the very fact that this diode 174 is set to carry current in the reverse bias direction means that the residual state of magnetization of the core 152 has been reversed in the transfer or readout process. On the other hand, the cores 150 and 154 have been unchanged and the diodes 172 and 176 associated with these cores are not set to pass current in the reverse bias direction. Shortly after the readout from the cores has been accomplished, the pulse from the source 164 delayed by the element 178 is utilized to trigger the current pulse source 180 to apply a positive reverse current to the lead 182. The result will be a current flow through the diode 174, and no current flow through the output winding 186 of core 152 due to the shunting action of diode 174. This core, 152, will therefore remain in the reversed or binary 0 condition in which it was set by the readout current in the winding 158. However, the diodes 172 and 176 will block the passage of current and the current will therefore flow through the output windings 184 and 188 and will act to reverse (i.e., set to 1) the state of cores 150 and 154 which were unchanged by the transfer or readout pulse applied to lead 162.

By the above-described means, the driving lead 162 is utilized to change all of the cores which were in one state of residual magnetization and at the same time charge the diodes associated with the output windings of these cores. Thereafter, a second pulse applied to the lead 182 is utilized to reverse the state of all of the cores which were not reversed by the first pulse. The effect of the timed pair of pulses on leads 162 and 182 is to reverse all of the cores in the register and thereby achieve a complement of the digital word which was originally stored in the register. Implicit in the foregoing description is the requirement that the timed pair of pulses on leads 162 and 182 should be delayed or spaced apart in time less than the recovery time of the slow recovery diodes 172, 174, 176.

It will be obvious from a consideration of the above circuits that they may be combined on a single core register to achieve a stepping register in which the information can be read out repeatedly with an automatic rewrite circuit as described in FIG. 3, and in which a stored number can be complemented by a reversal of each of the cores in the register whenever that step is necessary. The principal engineering considerations involved in utilizing all of these circuits in the same core register is that each winding on the core represents an additional load and therefore a register containing a large number of windings on each core will require relatively heavy driving currents. Furthermore, the output pulses from the cores in such an instance must be stronger than in the case where each core carries a more limited number of windings.

The above-described invention discloses novel and useful circuit means whereby a bi-state storage element and a slow recovery semi-conductive device may be combined to achieve highly valuable characteristics. The information which may be stored permanently as the residual flux direction within the magnetic elements may be temporarily stored as the distribution state of the "holes" in the slow recovery semi-conductor devices. With proper timing of the energy sources the information temporarily stored in the semi-conductor devices may be read out to the same or other cores to achieve the desired type of computer operation.

The present application is a continuation of applicants' copending application Serial No. 556,724, filed December 30, 1955 (and now abandoned).

We claim:

1. In apparatus for handling binary digital information, the combination comprising a bi-state magnetic core having substantial residual magnetization characteristics and in which the state of the core is represented by the direction of residual magnetization of the core; a series circuit including an output winding on said core, a fast recovery diode, a slow recovery diode, and a pulse source; said diodes both being poled to conduct forward current in response to the voltage induced in said output winding when said core switches from a first state to the second state; a utilization device connected in parallel with the series combination of said fast recovery diode and said output winding; pulse means for applying a magnetomotive force to said core tending to switch the latter to said second state; and said pulse source including means for applying a reverse voltage to said slow recovery diode with a short delay after termination of said magnetomotive force; so that current flows reversely through said slow recovery diode and thence through said utilization device only when said core was in said first state prior to application of said magnetomotive force, and such current is blocked by said fast recovery diode from passage through said output winding.

2. In apparatus for handling binary digital information, the combination comprising a bi-state magnetic core having substantial residual magnetization characteristics and in which a binary "1" or "0" is stored by residual magnetism in one direction or the other; a transfer winding and an output winding on said core; a series circuit including said output winding, a fast recovery diode, a slow recovery diode, and a pulse source; said diodes both being poled to conduct forward current in response to the voltage induced in said output winding when said core switches from the "1" to the "0" state; a utilization device connected in parallel across the series combination of said output winding and said fast recovery diode; means for applying a current pulse to said transfer winding tending to drive said core to its "0" state; and means for causing said pulse source to generate a voltage pulse with a short delay after said current pulse and with a polarity tending to cause reverse current flow through said slow recovery diode, whereby a current pulse flows through said utilization device only if said core has just switched to the "0" state and current flow through said output winding due to said voltage pulse is blocked by said fast recovery diode.

3. A diode controlled magnetic stepping register comprising a plurality of bi-state magnetic cores having substantial retentivity, an input winding for each core, an output winding for each core, a transfer winding for each core, a fast recovery diode and a slow recovery diode in series with each of said output windings and poled to conduct forward current in response to the voltage induced in the corresponding output winding when the corresponding core switches from a first state to the second state, a pulse source, each series combination formed by one output winding and the two diodes associated therewith being connected in a complete series circuit through said pulse source, means connecting each of said input windings except the first one in parallel with the series combination of the output winding and fast recovery diode for the preceding core, means for simultaneously applying current pulses through all of said transfer windings in a direction tending to cause switching of all of said cores to said second state, and means for causing said pulse source to generate a voltage pulse with a short delay after said current pulses and tending to cause reverse current flow through said slow recovery diodes, whereby the state of each core is transferred to the next succeeding core and said fast recovery diodes prevent reverse current flow through said output windings.

4. In apparatus for handling binary digital information, the combination comprising a bi-state magnetic core having substantial retentivity; a transfer winding, an output winding, and a reset winding on said core, a series circuit including said output winding, a fast recovery diode, a slow recovery diode, and a pulse source with said diodes both poled to conduct forward current in response to the voltage induced in said output winding when said core is switched from the first state to the second state, said reset winding being connected in parallel with the series combination of said output winding and fast recovery diode, means for applying a current pulse to said input winding tending to switch said core to said second state, means for causing said pulse source to generate a voltage pulse with a short delay after said current pulse and which tends to produce reverse current through said slow recovery diode, such reverse current passing through said reset winding but being blocked by said fast recovery diode from passage through said output winding, said reset winding being poled such that the said reverse current passed therethrough switches said core from said second to said first state.

5. In apparatus for handling binary digital information, the combination comprising a bi-state magnetic core having substanital retentivity, and representing a "1" or a "0" by the direction of residual flux therein, a transfer winding and an output winding on said core, a slow recovery diode connected in parallel with said output winding and poled to conduct forward current in response to the voltage induced in said output winding when said core switches from the first state to the second state, said diode having a predetermined recovery time following forward conduction and during which it conducts appreciable reverse current in response to a reverse voltage thereacross, a pulse source connected in series with said diode and adapted to generate voltage pulses tending to produce reverse current through said diode, means to apply a current pulse to said transfer winding tending to switch said core to said "0" state, and means for activating said pulse source with a short time delay after said current pulse, said time delay being less than said diode recovery time, whereby said diode shunts current resulting from said voltage pulse around said output winding if said core was initially in the "1" state and forces current resulting from said voltage pulse through said output winding to set said core to the "1" state if it was initially in the "0" state, thereby to complement the binary information held in the core.

References Cited in the file of this patent

UNITED STATES PATENTS

| | | |
|---|---|---|
| 2,680,819 | Booth | June 8, 1954 |
| 2,753,545 | Lund | June 3, 1956 |
| 2,825,820 | Sims | Mar. 4, 1958 |
| 2,847,159 | Curtis | Aug. 12, 1958 |
| 2,866,178 | Lo et al. | Dec. 23, 1958 |
| 2,879,409 | Holt | Mar. 24, 1959 |
| 2,908,830 | Mason et al. | Oct. 13, 1959 |

OTHER REFERENCES

"Handbook of Semiconductor Electronics (Hunter), published by McGraw-Hill, 1956. (Chapter 15, pages 49 and 50 relied on.)